Patented Mar. 24, 1942

2,277,259

UNITED STATES PATENT OFFICE 2,277,259

PLASTIC POLYVINYL ALCOHOL COMPOSITIONS

Ernst Schnabel, Berlin-Lichterfelde, Germany, and Charles Dangelmajer, Dover, N. J., assignors to Resistoflex Corporation, New York, N. Y., a corporation of New York No Drawing. Application April 19, 1939, Serial No. 268,754

36 Claims. (Cl. 260—4)

The present invention relates in general to compositions of matter made with polyvinyl alcohol and more particularly to the plasticizing of such compositions.

The term "polyvinyl alcohol" is used herein to include any polymer of vinyl alcohol, as well as any mixture of such polymers. Polyvinyl alcohol is at present commercially produced by alkaline or acid hydrolysis of ploymerized vinyl esters, especially the acetate. The products obtained by this method may vary widely in saponification number as a result of more or less complete hydrolysis of the ester used. The term "polyvinyl alcohol" is also used herein to include any of such products.

The compositions made in accordance with this invention may ultimately take such varied forms as films, threads, bands, tubing, sheets, moulded articles, etc., it being understood that such products of the invention may be arrived at by any method of forming known in the art, as by extrusion, by moulding, by surface coating, etc. The compositions of the invention may also be used for impregnating textiles and porous materials of various kinds.

The making of plastic compositions of polyvinyl alcohol requires the use of a solvent for for the polyvinyl alcohol, for which purpose water is generally used, largely for reasons of economy. Because of its volatility, however, water is not a plasticizer in the sense of prolonged plasticity of the compositions resulting from its use. Therefore, where water, or any other substance of similar volatility, is used as a solvent for the polyvinyl alcohol, it is further required that such solvent be used in conjunction with an additional plasticizing means, if plastic compositions of any practical value are desired.

The substances hitherto employed for the purpose of prolonging the plasticity of the polyvinyl alcohol compositions have all been organic substances of low volatility, characterized by solubility. Two general types have been in use. One has consisted of substances also having a solvent action on the polyvinyl alcohol, such as formamide and many of its derivatives, while the other has consisted of compatible substances having a physical attraction for water, such as glycerine or sorbitol. It is particularly important to note, however, that each type has consisted of substances capable of entering into solution in the compositions.

Certain difficulties have hitherto been experienced in the plasticizing of polyvinyl alcohol compositions. Although these are well recognized in the art, they will nevertheless be briefly discussed for a more complete understanding of the invention.

Because the plasticizers hitherto used in polyvinyl alcohol compositions have always been used in a state of solution in such compositions, there has been a loss of plasticity in the finished products in the course of time. This loss of plasticity has resulted from the volatility of the plasticizers, including the organic substances used for extended plasticity. In certain cases, it has also resulted from a leaching out of these organic substances by contact of the finished products with solvent liquids. Whatever factors may have contributed to the reduction in the amount of the plasticizers hitherto used in polyvinyl alcohol compositions, this loss has been due essentially to the fact that these plasticizers have been used in a state of solution in such compositions.

The organic substances which have hitherto been most commonly employed as plasticizers in polyvinyl alcohol compositions have been those having the property of attracting water as a solvent for the polyvinyl alcohol, but these have led to even greater difficulties by reason of this very property. In the case of glycerine, for example, the high degree of hygroscopicity of this substance causes it to absorb moisture from the atmosphere even after the polyvinyl alcohol compositions in which it is contained have been formed into the products desired. A considerable amount of water may thus be deposited on the surface of these products with the result that they "sweat." Aside from the dissolving action of this water deposit on the glycerine, there is also the possibility that the polyvinyl alcohol itself may be drawn into the aqueous layer with a resulting tackiness or slipperiness of the surface. Even where no collection of moisture is detectable from the outside, these polyvinyl alcohol products containing such hygroscopic substances as glycerine are subject to appreciable variations in the amount of bound water, by reason of changes in the degree of humidity of their surroundings. Depending on the nature of the change, they may either expand or contract, which is particularly troublesome, of course, where the maintenance of exact dimensions is necessary. It is thus clear that by far the greater difficulties experienced with the organic substances hitherto employed as plasticizers in polyvinyl alcohol compositions have been with the preferred type having a physical attraction for water.

The general object of the present invention is to improve the plasticizing of polyvinyl alcohol compositions.

The polyvinyl alcohol compositions of the invention also contain a solvent for the polyvinyl alcohol, as well as organic substances for prolonging their plasticity. In contradistinction to the qualities of the organic substances hitherto used for this purpose, however, the organic substances employed as additional plasticizers by the invention are all substantially non-volatile substances that are neither soluble in the solvent for the polyvinyl alcohol nor solvents for the polyvinyl alcohol to any appreciable extent. Their substantial insolubility in the solvent for the polyvinyl alcohol, of course, precludes their having any appreciable physical attraction for such solvent. The basis of this invention is the discovery that organic substances fulfilling these characteristics are extremely useful for prolonging the plasticity of polyvinyl alcohol compositions, provided they are used in a state of dispersion in such compositions. In this state they produce a plasticizing effect that can be regarded as being in the nature of an internal lubrication of the entire mass of material plasticized, so that the need of retaining the solvent for the polyvinyl alcohol is considerably reduced from the standpoint of prolonged plasticity. These organic substances may thus be called "mechanical plasticizers" to distinguish them from the plasticizers of the prior art producing their plasticizing effect through their state of solution in polyvinyl alcohol compositions.

The aforementioned mechanical plasticizers impart to polyvinyl alcohol products a plasticity of extremely extended duration. In this connection the important fact should be noted that their volatility as compared to the soluble substances of the prior art is altogether insignificant. Also of great importance is the fact that they are not at all subject to diffusion through the material plasticized. More specifically stated, they form microscopical globules or particles that retain their initial position in the structure of such material. Consequently, their very state of dispersion in itself prevents their volatilizing, as well as any leaching out effects by liquids that may intentionally or unintentionally be caused to contact with the finished products. It may truly be said that, from a practical standpoint, the aforementioned mechanical plasticizers result in polyvinyl alcohol products of permanent plasticity.

Since the substances used as mechanical plasticizers according to the invention are not of the nature of hygroscopic substances, they are not at all affected by atmospheric conditions. They do not exude to the surface of the finished products or cause them to "sweat" under the influence of humidity. They cause neither swelling nor shrinkage in these products.

In fact, many of the substances used as mechanical plasticizers according to the invention are more or less hydrophobic in nature. That this is an advantage in itself is apparent from the fact that polyvinyl alcohol is a hydrophilic substance. Therefore, when hydrophobic substances are used as mechanical plasticizers in the compositions of the invention, their effect is to reduce the water-sensitivity of the products made from these compositions.

Another important advantage of the mechanical plasticizers of the invention is the greatly improved thermostability of the polyvinyl alcohol products resulting from their use. For example, flexible tubing can be made in accordance with this invention that is capable of conveying liquids heated to temperatures as high as from 120° to 130° C. while retaining sufficient plasticity for practical purposes, whereas the best tubing of the prior art would soon become hard and brittle under these conditions. It may generally be stated that the polyvinyl alcohol products of the invention may be employed at temperatures entirely prohibited by the soluble plasticizers of the prior art.

In view of the pronounced hydrophobic properties of oils, these are well adapted for use as the mechanical plasticizers of this invention. The type of oil used is of no great importance in this connection. Oils of mineral, vegetable, or animal origin may thus be used. Moreover, they may be non-drying, such as sesame oil or peanut oil; or semi-drying, such as castor oil; or drying, such as linseed oil or wood oil. Oxidized or unoxidized oils may be used, as well as polymerized oils.

The invention is not limited to the use of oils as its mechanical plasticizers. On the contrary, a very great variety of materials are available for use as such plasticizers. Fats of all types may thus be used. Other materials include various natural and synthetic hydrocarbons and their polymers, the higher fatty acids and their esters, the esters of various other acids, the higher alcohols, and various compounds of the terpene group. Even such materials as natural and artificial resin and natural and artificial rubber may be used.

It is required of the mechanical plasticizer that it, in itself, shall have as great a deformability as the remainder of the composition. Otherwise it would increase the hardness of the composition and would not act as a plasticizer. The term "deformability" is used herein to describe the quality of mobility when force is applied tending to change the shape of the substance, which substance may be either a plastic or a fluid.

It is understood that the polyvinyl alcohol compositions of the present invention are not restricted to a single substance as the mechanical plasticizer, which may be a mixture of two or more substances. Moreover, such compositions may contain a plurality of mechanical plasticizers, each of which may consist of one or more substances. Soluble organic substances of the prior art may also be included. Particularly useful compositions can be produced, for example, by employing minor amounts of glycerine. It is further understood that the solvent for the polyvinyl alcohol in the compositions of the present invention need not be water, but may be some other single substance or a mixture of substances.

In contrast with the soluble plasticizers of the prior art, the mechanical plasticizers of this invention generally require special measures for their required dispersion in the finished products. There are various ways of proceeding, of course, which may be said to depend largely on the nature of the products desired. For the guidance of the operator, certain practical methods of arriving at this required dispersion of the mechanical plasticizers of this invention will now be described.

Where the proportion of water or other solvent for the polyvinyl alcohol to be contained in the material to be plasticized is small, if it is attempted to introduce the mechanical plasticizer or plasticizers in their normal undivided state, the result in most cases is an entirely useless mixture. The introduction of the mechanical plasticizer or plasticizers is perfectly successful, however, if they are used with the solvent for the polyvinyl alcohol in the form of an emulsion. In general, an emulsifying agent will be required for this purpose. Where water is used, this may be polyvinyl alcohol itself, although other well-known emulsifying substances may be used, such as Irish moss, Turkey-red oil, amine soaps, etc. One may thus proceed by first producing an aqueous emulsion of the mechanical plasticizer or plasticizers in well-known manner, as by treatment in a colloid mill or high-speed paddle-type mixer. With this emulsion the required proportion of polyvinyl alcohol may then be thoroughly admixed in its natural powdered state. A uniform mixture in the form of moistened particles is thus obtained which can readily be processed into the products desired. For example, it can first be reduced, as by kneading under heat into a shapable plastic mass, which may then be extruded into threads, tubes, band, etc., or formed into various other shaped articles by moulding, a process of this type being described in Schnabel Patent No. 2,177,612, issued Oct. 24, 1939. If the percentage of solvent for the polyvinyl alcohol in the original mixture is too large, it can, of course, be evaporated to the amount required for the subsequent processing. By this method it is possible to successfully introduce considerable amounts of the mechanical plasticizer or plasticizers in exceedingly fine uniform dispersion, even where a slight amount of solvent is required. As indicated in the examples hereinafter set forth, the amount of mechanical plasticizer may be as high as about 59% by weight of the polyvinyl alcohol. The examples show amounts ranging from about 9% to about 59%. The preferred range when using fluid mechanical plasticizers is from about 10% to about 20%.

If the proportion of solvent for the polyvinyl alcohol is large enough to produce a fluid solution of polyvinyl alcohol, there is no difficulty in introducing the mechanical plasticizer or plasticizers directly into this solution, provided the proper measures are employed to assure their dispersion. In the casting of films, it is the usual practice to apply such a solution of polyvinyl alcohol containing the plasticizer or plasticizers desired on a suitable surface, the solution thus applied being thereafter left to dry. Articles may be formed from such a solution by the usual dipping procedures. Likewise, impregnated sheet material, diaphragms, etc., can be made by applying a solution of this type to a woven fabric, paper or other porous material. In such cases one may proceed by first dissolving the polyvinyl alcohol in the required amount of solvent. Where water is used, the mechanical plasticizer or plasticizers may then be readily emulsified in this solution with or without addition of an emulsifying agent other than the dissolved polyvinyl alcohol. A fluid mass is thus obtained which is ready for use in the making of the products desired. Upon drying, the ratio of the mechanical plasticizer or plasticizers to the polyvinyl alcohol may also be quite large in such products.

It is understood that the products of the invention are not restricted to those made by the foregoing mehods of introducing the mechanical plasticizers. Even where the requirement of solvent is small, direct addition of the mechanical plastizer or plasticizers in their natural undivided state may sometimes be possible. Very useful products have thus been obtained by first producing a plastic mass of polyvinyl alcohol by the use of a soluble plasticizer of the prior art and thereafter incorporating such mechanical plasticizers as resin or rubber by mere mastication. It should also be noted that a mere dispersion rather than an emulsion of the mechanical plasticizer or plasticizers may sometimes suffice for its incorporation into the material to be subsequently processed into the finished products. The foregoing methods of introducing the mechanical plasticizers of this invention should be regarded as being merely illustrative of methods which can be used in making some of the products of the invention.

A number of specific compositions which were produced in reducing the invention to practice will now be described by way of illustration, it being understood that they should not be construed as limiting the invention to the ingredients specified or to the stated amounts of these ingredients.

Various compositions were produced by first dispersing the mechanical plasticizer or plasticizers in water. In most cases, this dispersion was brought about by emulsification, for which purpose a particular grade of polyvinyl alcohol of high viscosity and high saponification number was used as an emulsifying agent, which in some cases was assisted by a further emulsifying substance. In making these emulsions, the emulsifying substance or substances were dissolved in the water, after which the mechanical plasticizer or plasticizers were added and the resulting mixtures treated in the usual manner to effect emulsification. The various preliminary dispersions produced had the following formulae, their subsequent use being hereinafter described:

*Example 1*

|  | Grams |
|---|---|
| Water | 38.4 |
| Polyvinyl alcohol | 1.6 |
| Oxidized linseed oil | 10.0 |
| Turpentine | 4.0 |
|  | 54.0 |

The oxidized linseed oil and turpentine are miscible substances and therefore constituted a single mechanical plasticizer, which was dispersed in the water by emulsification with the polyvinyl alcohol.

*Example 2*

|  | Grams |
|---|---|
| Water | 24.0 |
| Polyvinyl alcohol | 1.0 |
| Oxidized linseed oil | 10.0 |
| Turpentine | 4.0 |
| Glycerine | 25.0 |
|  | 64.0 |

This is similar to Example 1 with the addition of glycerine and is therefore an example of the conjoint use of a mechanical plasticizer with a soluble plasticizer of the usual type.

*Example 3*

|  | Grams |
|---|---|
| Water | 24.0 |
| Polyvinyl alcohol | 1.0 |
| Oxidized linseed oil | 10.0 |
| Turpentine | 4.0 |
| Ethanol acetamide | 12.0 |
|  | 51.0 |

Here, the ethanol acetamide, a soluble plasticizer having a solvent action for the polyvinyl alcohol, was used instead of the glycerine of Example 2.

Example 4

| | Grams |
|---|---|
| Water | 24.0 |
| Polyvinyl alcohol | 1.0 |
| Oxidized linseed oil | 10.0 |
| Turpentine | 4.0 |
| Glycerine | 20.0 |
| Ethanol acetamide | 10.0 |
| | 69.0 |

This is similar to Example 3, but has glycerine in addition.

Example 5

| | Grams |
|---|---|
| Water | 38.4 |
| Polyvinyl alcohol | 1.6 |
| Dibutyl sebacate | 10.0 |
| | 50.0 |

The dibutyl sebacate alone functioned as a mechanical plasticizer.

Example 6

| | Grams |
|---|---|
| Water | 24.0 |
| Polyvinyl alcohol | 1.0 |
| Dibutyl sebacate | 10.0 |
| Glycerine | 25.0 |
| | 60.0 |

This is similar to Example 5, but has glycerine in addition.

Example 7

| | Grams |
|---|---|
| Water | 24.0 |
| Polyvinyl alcohol | 1.0 |
| Dibutyl sebacate | 10.0 |
| Ethanol acetamide | 12.0 |
| | 47.0 |

The ethanol acetamide replaces the glycerine of Example 6.

Example 8

| | Grams |
|---|---|
| Water | 24.0 |
| Polyvinyl alcohol | 1.0 |
| Dibutyl sebacate | 10.0 |
| Glycerine | 20.0 |
| Ethanol acetamide | 10.0 |
| | 65.0 |

This is similar to Example 7, but has glycerine in addition.

Example 9

| | Grams |
|---|---|
| Water | 38.4 |
| Polyvinyl alcohol | 1.6 |
| Turpentine | 4.0 |
| Mineral oil | 10.0 |
| | 54.0 |

The turpentine and mineral oil functioned as a single mechanical plasticizer.

Example 10

| | Grams |
|---|---|
| Water | 24.0 |
| Polyvinyl alcohol | 1.0 |
| Turpentine | 4.0 |
| Mineral oil | 10.0 |
| Glycerine | 25.0 |
| | 64.0 |

This is similar to Example 9, but has glycerine in addition.

Example 11

| | Grams |
|---|---|
| Water | 24.0 |
| Polyvinyl alcohol | 1.0 |
| Turpentine | 4.0 |
| Mineral oil | 10.0 |
| Ethanol acetamide | 12.0 |
| | 51.0 |

The ethanol acetamide replaced the glycerine of Example 10.

Example 12

| | Grams |
|---|---|
| Water | 24.0 |
| Polyvinyl alcohol | 1.0 |
| Turpentine | 4.0 |
| Mineral oil | 10.0 |
| Glycerine | 20.0 |
| Ethanol acetamide | 10.0 |
| | 69.0 |

This is similar to Example 11, but has glycerine in addition.

Example 13

| | Grams |
|---|---|
| Water | 50.0 |
| Glycerine | 38.0 |
| Santicizer #9 | 10.0 |
| | 98.0 |

The "Santicizer #9" is ortho and para-toluene sulphonamide made by Monsanto Chemical Co. It was used as the mechanical plasticizer, a satisfactory dispersion being produced without emulsification. The glycerine was used as a soluble plasticizer.

Example 14

| | Grams |
|---|---|
| Water | 38.4 |
| Polyvinyl alcohol | 1.6 |
| Pine oil | 10.0 |
| | 50.0 |

Pine oil alone was used as a mechanical plasticizer.

Example 15

| | Grams |
|---|---|
| Water | 24.0 |
| Polyvinyl alcohol | 1.0 |
| Pine oil | 10.0 |
| Glycerine | 25.0 |
| | 60.0 |

This is similar to Example 14, but has glycerine in addition.

Example 16

| | Grams |
|---|---|
| Water | 38.0 |
| Polyvinyl alcohol | 1.4 |
| Triethanol amine | 0.18 |
| Lanolin | 0.42 |
| Vistanex | 10.0 |
| | 50.0 |

The "Vistanex" is a synthetic rubber product sold under that name by Advance Solvents & Chemicals Corp. and consisting of polymerized butylene and/or isobutylene. It is immiscible with lanolin, so that the "Vistanex" and lanolin each functioned separately as a mechanical plasticizer. An emulsion of these substances was prepared employing the polyvinyl alcohol and the triethanol amine as emulsifying agents.

Example 17

| | Grams |
|---|---|
| Water | 23.5 |
| Polyvinyl alcohol | 0.9 |
| Triethanol amine | 0.18 |
| Lanolin | 0.42 |
| Vistanex | 10.0 |
| Glycerine | 25.0 |
| | 60.0 |

This is similar to Example 16, but has glycerine in addition.

Example 18

| | Grams |
|---|---|
| Water | 38.4 |
| Polyvinyl alcohol | 1.6 |
| Menhaden oil | 10.0 |
| | 50.0 |

A single mechanical plasticizer was used consisting of Menhaden oil alone.

Example 19

| | Grams |
|---|---|
| Water | 24.0 |
| Polyvinyl alcohol | 1.0 |
| Menhaden oil | 10.0 |
| Glycerine | 25.0 |
| | 60.0 |

This is similar to Example 18, but has glycerine in addition.

Example 20

| | Grams |
|---|---|
| Water | 38.4 |
| Polyvinyl alcohol | 1.6 |
| Triethanol amine | 2.0 |
| Cetyl alcohol | 10.0 |
| Lanolin | 2.0 |
| | 54.0 |

The cetyl alcohol and lanolin, which are miscible substances, constituted a single mechanical plasticizer, an emulsion of which was produced with the additional use of triethanol amine as an emulsifying agent.

Example 21

| | Grams |
|---|---|
| Water | 24.0 |
| Polyvinyl alcohol | 1.0 |
| Triethanol amine | 2.0 |
| Cetyl alcohol | 10.0 |
| Lanolin | 2.0 |
| Glycerine | 25.0 |
| | 64.0 |

This is similar to Example 20, but has glycerine in addition.

Example 22

| | Grams |
|---|---|
| Water | 28.8 |
| Polyvinyl alcohol | 1.2 |
| Oxidized linseed oil | 7.0 |
| Turpentine | 2.0 |
| Mineral oil | 2.0 |
| Neoprene latex (20% solids) | 50.0 |
| Glycerine | 35.0 |
| | 126.0 |

This is an example of four substances used as mechanical plasticizing means, namely, the oxidized linseed oil, the turpentine, the mineral oil, and the neoprene latex, these substances being used in conjunction with glycerine as a soluble plasticizer.

Example 23

| | Grams |
|---|---|
| Water | 38.4 |
| Polyvinyl alcohol | 1.6 |
| Oxidized linseed oil | 6.0 |
| Natural rubber latex (40% solids) | 9.0 |
| Glycerine | 35.0 |
| | 90.0 |

The oxidized linseed oil and natural rubber latex were mechanical plasticizers, the glycerine being used as a soluble plasticizer.

As will be noted, the ingredients of the foregoing 23 preliminary dispersions are totaled in each instance. Each of these dispersions was thoroughly mixed with powdered polyvinyl alcohol in the ratio of this total in grams to 100 grams of polyvinyl alcohol. The resulting mixtures were all used for moulding sheets at elevated temperature in a hydraulic press. Three sets each consisting of 23 test pieces were cut from these sheets, which were respectively tested as follows:

The 23 test pieces of one set, together with some test pieces made in the ordinary way in the absence of mechanical plasticizers, were kept in a drying oven at a temperature of from 52° to 55° C. for 48 hours, after which all test pieces were removed from the oven, cooled to room temperature, and tested for flexibility by bending 180 degrees in both directions. All of the 23 test pieces of the invention remained flexible, while the test pieces of the prior art were brittle and broke after three flexures.

The 23 test pieces of the second set, together with some test pieces made in the ordinary way in the absence of mechanical plasticizers, were immersed for 20 hours in mineral oil maintained at a temperature of from 110° to 120° C., after which all test pieces were removed from the oil, cooled to room temperature and examined. It was found that all of the 23 test pieces of the invention retained their original shape and remained flexible, while the test pieces of the prior art were hard and brittle.

The 23 test pieces of the third set, together with some test pieces made in the ordinary way in the absence of mechanical plasticizers, were immersed in water for 24 hours. Many of the test pieces of the invention retained a remarkable mechanical strength. None of them was actually dissolved, although the absorption of water varied to a great extent. The test pieces of the prior art all completely dissolved.

Some of the mixtures obtained by admixing the foregoing preliminary dispersions with polyvinyl alcohol were also used to make tubing by first milling into sheets and subsequent feeding of these sheets through an extruder. In each of these instances it was found that the rate of extrusion was considerably improved. It was apparent that the friction between the hot compositions and the interior parts of the extruder was reduced by the mechanical plasticizers acting as lubricants.

Example 24

Polymerized cashew shell oil sold under the trade name "Cardolite" and the hydrocarbon polymer manufactured by the Standard Oil Company of California under the name "Viscous Oil No. 32," which is a polymerized hydrocarbon consisting of butylene and/or isobutylene are examples of polymerized oils which have been incorporated as mechanical plasticizers in polyvinyl alcohol compositions with excellent results. A composition including these oils was prepared by first producing an emulsion containing the following ingredients:

| | Grams |
|---|---|
| Cardolite #627 light | 10 |
| Viscous oil #32 | 2 |
| Circo X heavy mineral oil | 2 |
| Formamide | 3 |
| 4% solution of polyvinyl alcohol | 20 |

This emulsion was then diluted with a solution consisting of:

| | Grams |
|---|---|
| Glycerine | 25 |
| Formamide | 10 |
| Water | 55 |

The diluted emulsion was mixed with 100 g. of powdered polyvinyl alcohol. This mixture was then used to make moulded sheets, which were cut into test strips of 75 x 14 mm. After being preliminarily dried for fourteen hours at a temperature of from 55° to 60° C., these strips were exposed for sixteen days to various solvents with the view to determining their shrinkage or swelling. The results of these tests with reference to the percentage increase or decrease of the longer dimension of the strips are given in the following table:

Contraction (—) or swelling (+) in per cent

| | |
|---|---|
| Gasoline | 0.0 |
| Xylene | —0.39 |
| Ethanol | +0.39 |
| Isopropanol | —0.66 |
| Acetone | +0.39 |
| Ethyl acetate | +0.4 |
| Methylene dichloride | +0.25 |
| Carbon tetrachloride | +0.65 |
| Trichlor ethylene | +1.0 |
| Monochlor benzene | +0.64 |
| Paraffin oil | 0.0 |

The foregoing tests make quite apparent the advantages provided by the invention with reference to the resistance of its products to solvents for the mechanical plasticizers.

The following two examples appertain to procedures which are applicable when such materials as rubber are used as mechanical plasticizers.

*Example 25*

Polyvinyl alcohol films containing approximately 57% by weight of the alcohol were first prepared in the ordinary way employing water as the solvent for the polyvinyl alcohol and glycerine as a soluble plasticizer. A 157 gram portion of these films was masticated with 10 grams of the synthetic rubber product, which is a copolymer of butadiene and acrylic acid, known commercially as "Perbunan." A very careful examination of the resulting product showed that the "Perbunan" was very finely dispersed and its particles coated with polyvinyl alcohol.

*Example 26*

A 75 gram portion of the same polyvinyl alcohol films was here used with 25 grams of "Perbunan" initially plasticized with 10 grams of tricresyl phosphate. A short period of mastication yielded a product in which the "Perbunan" particles were coated with polyvinyl alcohol.

Moulded test pieces were formed from the compositions obtained in Examples 25 and 26. These pieces were of improved flexibility. They were subjected to various tests showing that all of the aforementioned advantages of the invention were provided by the "Perbunan," which acted in every sense as a mechanical plasticizer. It could not be leached out by prolonged immersion of the test pieces in toluol.

The same general type of product was obtained from compositions similarly produced with the artificial or synthetic rubbers known as "Buna," "neoprene" and "Thiokol," as well as with natural and reclaimed rubber. "Buna" is a copolymer of a butadiene and styrene, "neoprene" is polymerized chloroprene, and "Thiokol" is polymethylene polysulphide.

The following two examples are illustrative of the use of resins as mechanical plasticizers.

*Example 27*

With 50 grams of polyvinyl alcohol were mixed 10 grams of ethyl cellulose in the form of a fluffy white powder. For the purpose of plasticizing the ethyl cellulose there was added to the mix a solution of 3 grams of "Dow Plasticizer #6" in 5 grams of toluol and 10 grams of ethanol. After a thirty-minute storage period it was found that the ethyl cellulose had absorbed a sufficient amount of the "Dow Plasticizer #6" to render its particles transparent. The material at this stage was mixed with a solution of 17.5 grams of glycerine and 2.5 grams of formamide in 25 grams of water. This mixture was then stored for 4 hours, after which it was masticated and calendered to films. An examination of these films showed that the plasticized ethyl cellulose was uniformly dispersed in the form of very fine particles coated with polyvinyl alcohol. Test pieces were finally made by molding the films into sheets. These showed very good flexibility and great toughness, as well as improved elasticity.

*Example 28*

A 10 gram portion of polyvinyl acetate of a viscosity of 17 centipoise was plasticized with 3 grams of dibutyl phthalate dissolved in 5 grams of methanol. A sheet milled from this material was placed between two others milled from a polyvinyl alcohol composition containing 100 grams of the alcohol, 30 grams of glycerine, 10 grams of formamide, and 50 grams of water. After masticating these sheets together through rollers, films were obtained containing the plasticized polyvinyl acetate in a fine state of dispersion. Molded test pieces made from these films were transparent. They showed great toughness, very good flexibility, and improved elasticity.

The resins of Examples 27 and 28 were plasticized prior to their introduction into the polyvinyl alcohol composition by mastication. However, other resins which are sufficiently soft or fluid at room temperature may be used as mechanical plasticizers. These resins may be introduced either directly by mastication or in the form of emulsions.

It is understood that such materials as rubbers and resins may be used in admixture with other substances to produce the mechanical plasticizers, as well as with other materials as independent plasticizers.

The foregoing examples of the invention make clear the advantages resulting from the use of mechanical plasticizers in polyvinyl alcohol compositions. In the compositions of the invention, of course, the usual fillers may be included, among which may be mentioned carbon black, graphite, cellulose materials, metal oxides, asbestos, clay, mica, and various other silicates. Pigments may also be included in the compositions of the invention.

What is claimed is:

1. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispered throughout said composition in the form of fine particles, said plasticizer being substantially non-volatile in the composition, insoluble in said solvent, having substantially no solvent power for polyvinyl alcohol and having a deformability at least as great as that of said composition, the amount of said plasticizer being from about 9% to about 59% by weight of the polyvinyl alcohol.

2. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising fatty material, the amount of said plasticizer being from about 9% to about 59% by weight of the polyvinyl alcohol.

3. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising an oil, the amount of said plasticizer being from about 9% to about 59% by weight of the polyvinyl alcohol.

4. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising an oil, the amount of said plasticizer being from about 10% to about 20% by weight of the polyvinyl alcohol.

5. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising a plurality of mixed fatty materials, the amount of said plasticizer being from about 9% to about 59% by weight of the polyvinyl alcohol.

6. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising a plurality of mixed fatty materials, the amount of said plasticizer being from about 10% to about 20% by weight of the polyvinyl alcohol.

7. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising drying oil, the amount of said plasticizer being from about 10% to about 20% by weight of the polyvinyl alcohol.

8. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising linseed oil, the amount of said plasticizer being from about 10% to about 20% by weight of the polyvinyl alcohol.

9. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising plastic resin, the amount of said plasticizer being from about 9% to about 59% by weight of the polyvinyl alcohol.

10. A solid plastic and apparently homogeneous composition for forming articles comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising plastic rubber, the amount of said plasticizer being from about 9% to about 59% by weight of the polyvinyl alcohol.

11. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, the amount of said plasticizer being from about 9% to about 59% by weight of the polyvinyl alcohol.

12. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising fatty material, the amount of said plasticizer being from about 9% to about 59% by weight of the polyvinyl alcohol.

13. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising an oil, the amount of said plasticizer being from about 9% to about 59% by weight of the polyvinyl alcohol.

14. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising an oil, the amount of said plasticizer being from about 10% to about 20% by weight of the polyvinyl alcohol.

15. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising a plurality of mixed fatty materials, the amount of said plasticizer being from about 9% to about 59% by weight of the polyvinyl alcohol.

16. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising a plurality of mixed fatty materials, the amount of said plasticizer being from about 10% to about 20% by weight of the polyvinyl alcohol.

17. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising drying oil, the amount of said plasticizer being from about 10% to about 20% by weight of the polyvinyl alcohol.

18. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising linseed oil, the amount of said plasticizer being from about 10% to about 20% by weight of the polyvinyl alcohol.

19. A solid plastic and apparently homogeneous formed composition comprising polyvinyl alcohol and a solvent for poylvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising plastic resin, the amount of said plasticizer being from about 9% to about 59% by weight of the polyvinyl alcohol.

20. A solid plastic and apparently homogeneous formed composition comprising polyvinyl alcohol and a solvent for polyvinyl alcohol in an amount by weight less than said alcohol containing, as a plasticizer for said composition, non-hygroscopic organic material uniformly dispersed throughout said composition in the form of fine particles, said plasticizer being substantially non-volatile in the composition, insoluble in said solvent, having substantially no solvent power for polyvinyl alcohol and having a deformability at least as great as that of said composition, said plasticizer comprising plastic rubber the amount of said plasticizer being from about 9% to about 59% by weight of the polyvinyl alcohol.

21. A solid plastic and apparently homogeneous composition for forming articles comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol and having a deformability at least as great as that of said composition, the amount of said non-hygroscopic plasticizer being not over about 59% by weight of the polyvinyl alcohol.

22. A solid plastic and apparently homogeneous composition for forming articles comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising fatty material, the amount of said non-hygroscopic plasticizer being not over about 59% by weight of the polyvinyl alcohol.

23. A solid plastic and apparently homogeneous composition for forming articles comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic resin, the amount of said non-hygroscopic plasticizer being not over about 59% by weight of the polyvinyl alcohol.

24. A solid plastic and apparently homogeneous composition for forming articles comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic rubber, the amount of said non-hygroscopic plasticizer being not over about 59% by weight of the polyvinyl alcohol.

25. A solid plastic and apparently homogeneous formed composition comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol and having a deformability at least as great as that of said composition, the amount of said non-hygroscopic plasticizer being not over about 59% by weight of the polyvinyl alcohol.

26. A solid plastic and apparently homogeneous formed composition comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, comprising fatty material, the amount of said non-hygroscopic plasticizer being not over about 59% by weight of the polyvinyl alcohol.

27. A solid plastic and apparently homogeneous formed composition comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic resin, the amount of said non-hygroscopic plasticizer being not over about 59% by weight of the polyvinyl alcohol.

28. A solid plastic and apparently homogeneous formed composition comprising polyvinyl alcohol, water in an amount by weight less than said polyvinyl alcohol, and at least one plasticizer of the low-volatility water-soluble type, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic rubber, the amount of said non-hygroscopic plasticizer being not over about 59% by weight of the polyvinyl alcohol.

29. A solid plastic and apparently homogeneous composition for forming articles comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol and having a deformability at least as great as that of said composition, the amount of said non-hygroscopic plasticizer being not over about 59% by weight of the polyvinyl alcohol.

30. A solid plastic and apparently homogeneous composition for forming articles comprising polyvinyl alcohol, water in an amount by weight less than said polyvinyl alcohol, and glycerine, and containing, as a non-hygroscopic plasticizer for said composition, non-hydroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising fatty material, the amount of said non-hygroscopic plasticizer being not over about 59% by weight of the polyvinyl alcohol.

31. A solid plastic and apparently homogeneous composition for forming articles comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic resin, the amount of said non-hygroscopic plasticizer being not over about 59% by weight of the polyvinyl alcohol.

32. A solid plastic and apparently homogeneous composition for forming articles comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic rubber, the amount of said non-hygroscopic plasticizer being not over about 59% by weight of the polyvinyl alcohol.

33. A solid plastic and apparently homogeneous formed composition comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol and having a deformability at least as great as that of said composition, the amount of said non-hygroscopic plasticizer being not over about 59% by weight of the polyvinyl alcohol.

34. A solid plastic and apparently homogeneous formed composition comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising fatty material, the amount of said non-hygroscopic plasticizer being not over about 59% by weight of the polyvinyl alcohol.

35. A solid plastic and apparently homogeneous formed composition comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic resin, the amount of said non-hygroscopic plasticizer being not over about 59% by weight of the polyvinyl alcohol.

36. A solid plastic and apparently homogeneous formed composition comprising polyvinyl alcohol, water in an amount by weight less than said polyvinyl alcohol, and glycerine, and containing, as a non-hygroscopic plasticizer for said composition, non-hygroscopic organic material uniformly dispersed throughout said composition in the form of fine particles, said non-hygroscopic plasticizer being substantially non-volatile in the composition, insoluble in water, having substantially no solvent power for polyvinyl alcohol, having a deformability at least as great as that of said composition, and comprising plastic rubber, the amount of said non-hygroscopic plasticizer being not over about 59% by weight of the polyvinyl alcohol.

ERNST SCHNABEL.
CHARLES DANGELMAJER.